(12) United States Patent
Keenan, Jr. et al.

(10) Patent No.: US 7,464,339 B2
(45) Date of Patent: Dec. 9, 2008

(54) METHOD AND DEVICE FOR UPGRADING A BUILDING CONTROL SYSTEM

(75) Inventors: Duane Keenan, Jr., Genoa City, WI (US); Steven L. Wesonga, Chicago, IL (US)

(73) Assignee: Siemens Building Technologies, Inc., Buffalo Grove, IL (US)

( * ) Notice: Subject to any disclaimer, the term of this patent is extended or adjusted under 35 U.S.C. 154(b) by 480 days.

(21) Appl. No.: 10/770,351

(22) Filed: Feb. 2, 2004

(65) Prior Publication Data

US 2004/0260431 A1 Dec. 23, 2004

Related U.S. Application Data

(60) Provisional application No. 60/443,902, filed on Jan. 31, 2003.

(51) Int. Cl.
*G06F 9/00* (2006.01)
(52) U.S. Cl. ...................... 715/762; 715/771
(58) Field of Classification Search ......... 715/771–773, 715/747, 964–965, 809, 810; 717/101, 169, 717/175; 455/420; 713/1, 2, 100; 700/90, 700/92; 705/27, 29; 709/223, 224, 226; 707/200
See application file for complete search history.

(56) References Cited

U.S. PATENT DOCUMENTS

| 6,393,425 | B1 * | 5/2002 | Kelly | 707/100 |
|---|---|---|---|---|
| 6,697,087 | B1 * | 2/2004 | Kelly | 715/735 |
| 6,785,805 | B1 * | 8/2004 | House et al. | 713/1 |
| 6,922,558 | B2 * | 7/2005 | Delp et al. | 455/420 |
| 7,003,560 | B1 * | 2/2006 | Mullen et al. | 709/223 |
| 7,124,397 | B1 * | 10/2006 | Mathur et al. | 717/101 |
| 2002/0147732 | A1 * | 10/2002 | Lee et al. | 707/200 |
| 2003/0061292 | A1 * | 3/2003 | Underseth et al. | 709/206 |
| 2004/0054675 | A1 * | 3/2004 | Li | 707/100 |
| 2006/0212880 | A1 * | 9/2006 | Underseth et al. | 719/328 |
| 2008/0136605 | A1 * | 6/2008 | Hunt et al. | 340/286.02 |

* cited by examiner

*Primary Examiner*—Steven P Sax (57) ABSTRACT

An integration tool is presented for integrating and/or commissioning a new device or system into a building control system. The integration tool is incorporated into the building control system and is operative to create one or more databases and/or applications for the new device that is then flashed to an appropriate building system controller. In one form, the present invention is a software tool for integrating a building control device into the building control system. In another form, the present invention is an integration tool for defining applications for new devices. In yet another form, the present invention is a seamless software tool that allows field personnel to create databases and define applications by simply following the defined point structure.

10 Claims, 11 Drawing Sheets

FIG. 6 lsb Builder Proto2

- J2A 3.3: JCI N2 MASTER
  - Standard Applications
    - Application From Ci... ST...
      - Report 0: REPORT 0
  - Custom Applications
  - lsb Files

102

| Subpt # | Point Name | Point Type | Descriptor | Units | Slope/Off | Intercept/On |
|---------|------------|------------|------------|-------|-----------|--------------|
| 00001 | READY | IDI | | | OFF | ON |
| 00002 | COMFAL | IDI | | | OFF | ON |
| 00003 | FCMFAL | IDO | | | OFF | |
| 00005 | TIMOUT | LAO | | | 1.00000 | 0.00000 |
| 00006 | RSPINT | LAO | | TICKS | 1.00000 | 0.00000 |
| 00007 | POLSUP | LAO | | MINS | 1.00000 | 0.00000 |
| 00008 | POLDLY | LAO | | TICKS | 1.00000 | 0.00000 |
| 00009 | POLFRQ | LAO | | | 1.00000 | 0.00000 |
| 00010 | ADDRESS | LAO | 104 | | 1.00000 | 0.00000 |
| 00011 | APPLICATI... | LAO | | | 1.00000 | 0.00000 |
| 00013 | MAXRTY | LAO | | SECS | 1.00000 | 0.00000 |
| 00014 | INICNT | LAO | | | OFF | ON |
| 00016 | EVENT | IDO | | | 1.00000 | 0.00000 |
| 00017 | CMDPND | LAI | | | 1.00000 | 0.00000 |
| 00018 | CMDHIW | LAI | | | 1.00000 | 0.00000 |
| 00020 | DIAGCL | LAO | | | 1.00000 | 0.00000 |
| 00021 | RESPON | LAI | | | 1.00000 | 0.00000 |
| 00022 | GOODPK | LAI | | | 1.00000 | 0.00000 |

| lsb Number | Application Number | Name | Size | Modified |
|------------|--------------------|----|------|----------|

| Subopt # | Point Name | Point Type | Descriptor | Units | Slope/Off | Intercept/On | INDEX1 | INDEX |
|---|---|---|---|---|---|---|---|---|
| 00001 | ADDRESS | LAO | DEVICE ADDRESS | | 1.00000 | 0.00000 | | |
| 00002 | APPLICATION | LAO | APPLICATION NUMBER | | 1.00000 | 0.00000 | | |
| 00003 | ZN1 | LAI | ZONE TEMP | DEG F | 1.00000 | 0.00000 | A1 | |
| 00004 | AI2 | LAI | SPARE AI-2 | | 1.00000 | 0.00000 | A1 | |
| 00005 | AI3 | LAI | SPARE AI-3 | | 1.00000 | 0.00000 | A1 | |
| 00006 | AI4 | LAI | SPARE AI-4 | | 1.00000 | 0.00000 | A1 | |
| 00007 | AI5 | LAI | SPARE AI-5 | | 1.00000 | 0.00000 | A1 | |
| 00008 | AI6 | LAI | SPARE AI-6 | | 1.00000 | 0.00000 | A1 | |
| 00009 | BI1 | LDI | SPARE BI-1 | | OFF | ON | BI | |
| 00010 | BI2 | LDI | SPARE BI-2 | | OFF | ON | BI | |
| 00011 | BI3 | LDI | SPARE BI-3 | | OFF | ON | BI | |
| 00012 | BI4 | LDI | SPARE BI-4 | | OFF | ON | BI | |
| 00013 | AO1 | LAO | SPARE AO-1 | | 1.00000 | 0.00000 | AO | |
| 00014 | AO2 | LAO | SPARE AO-2 | PCT | 1.00000 | 0.00000 | AO | |
| 00015 | DMPCMD | LAO | DAMPER COMMAND | | 1.00000 | 0.00000 | AO | |
| 00016 | DPR OP | LDO | DAMPER OPEN | | OFF | ON | BO | |
| 00017 | DPR CL | LDO | DAMPER CLOSE | | OFF | ON | BO | |
| 00018 | BO3 | LDO | SPARE BO-3 | | OFF | ON | BO | |
| 00019 | BO4 | LDO | SPARE BO-4 | | OFF | ON | BO | |
| 00020 | BO5 | LDO | SPARE BO-5 | | OFF | ON | BO | |
| 00021 | BO6 | LDO | SPARE BO-6 | | OFF | ON | BO | |
| 00022 | STARBOX | LDI | STARVED BOX | | OFF | ON | BO | |
| 00023 | OCCSTS | LDI | OCCUPIED STATUS | | OFF | ON | BO | |
| 00024 | SHUTSTS | LDI | SHUTDOWN STATUS | | OFF | ON | BO | |
| 00025 | WRMCMD | LDO | WARMUP COMMAND | | OFF | ON | BO | |
| 00026 | OCCCMD | LDO | OCCUPIED COMMAND | | UNOCC | OCC | BO | |
| 00027 | STBYCMD | LDO | STANDBY COMMAND | | OFF | ON | BO | |
| 00028 | BOXOPEN | LDO | SHUTDN BOX OP CMD | | OFF | ON | BO | |
| 00029 | BOXCLSE | LDO | SHUTDN BOX CL CMD | | OFF | ON | BO | |
| 00030 | SUM/WIN | LDO | SUMMER/WINTER | | OFF | ON | BO | |
| 00031 | OCCSTART | LAO | OCC START TIME | | 1.00000 | 0.00000 | ADI | |
| 00032 | OCCSTOP | LAO | OCC STOP-TIME | | 1.00000 | 0.00000 | ADI | |
| 00033 | ACTHTGSP | LAI | ACTUAL HTG SETPT | DEG F | 1.00000 | 0.00000 | ADF | |
| 00034 | ACTCLGSP | LAI | ACTUAL CLG SETPT | | 1.00000 | 0.00000 | ADF | |
| 00035 | OCCCLGSP | LAO | OCC CLG SETPT | DEG F | 1.00000 | 0.00000 | ADF | |
| 00036 | STBYCLG | LAO | STBYCLG SETPT | DEG F | 1.00000 | 0.00000 | ADF | |
| 00037 | UNOCCLG | LAO | UNOCC CLG SETPT | DEG F | 1.00000 | 0.00000 | ADF | |
| 00038 | CLGPB | LAO | CLG PROP BAND | | 1.00000 | 0.00000 | ADF | |
| 00039 | CLGIT | LAO | CLG INTEG TIME | | 1.00000 | 0.00000 | ADF | |
| 00040 | OCCHTGSP | LAO | OCC HTG SETPT | | 1.00000 | 0.00000 | ADF | |

METHOD AND DEVICE FOR UPGRADING A BUILDING CONTROL SYSTEM

This United States non-provisional patent application claims the benefit of and priority to U.S. Provisional Patent Application Ser. No. 60/443,902, filed Jan. 31, 2003, the entire contents of which is specifically incorporated herein by reference.

FIELD OF THE INVENTION

The present invention relates generally to building control systems of the type that control heating, ventilation, air conditioning, fire safety, lighting, security and other systems of a building or facility and, more specifically, to incorporation of new devices into such systems.

BACKGROUND OF THE INVENTION

Building control systems are employed to regulate and/or control various environmental and safety aspects of commercial, industrial and residential facilities (hereinafter, collectively referred to as "buildings"). Many buildings today include building automation/control systems that automatically control certain building functions such as HVAC, elevator operation, lighting, heating, alarm systems, security devices, sprinkler systems and the like. These systems are typically computer or processor based and controlled through firmware or software. In ordinary single-family residences, control systems tend to be simple and largely unintegrated. However, in large buildings, building control systems often consist of multiple, integrated subsystems employing hundreds of elements.

For example, a heating, ventilation and air-conditioning ("HVAC") building control system interrelates small, local control loops with larger control loops to coordinate the delivery of heat, vented air, and chilled air to various locations throughout a large building. Local control systems may use local room temperature readings to open or close vents that supply heated or chilled air. Larger control loops may obtain many temperature readings and/or air flow readings to control the speed of a ventilation fan, or control the operation of heating or chilling equipment.

As a consequence of the interrelationship of these control loops, many elements of a building control system must communicate information to each other. To this end, communication networks have been incorporated that transmit digital data between and among the various elements in accordance with one or more sets of protocols. By way of example, one or more local area networks using Ethernet or other standard protocols are often used to effect communication between elements and subsystems.

To this end, building control systems typically have one or more centralized control stations in which data from the system may be monitored, and in which various aspects of system operation may be executed, controlled and/or monitored. The control station typically includes a computer having processing equipment, data storage equipment, and a user interface. To allow for monitoring and control of the dispersed control system elements, building control systems often employ multi-level communication networks to communicate operational and/or alarm information between operating elements, such as sensors and actuators, and the centralized control station.

One example of a building control system control station is the APOGEE INSIGHT Workstation, available from Siemens Building Technologies, Inc. of Buffalo Grove, Ill., which may be used with the APOGEE building control system, also available from Siemens Building Technologies, Inc. In the APOGEE system, several control stations, connected via an Ethernet or other type of network, may be distributed throughout one or more building locations, each having the ability to monitor and control system operation at various system levels. As a consequence, different people in different locations of the facility may monitor and control building operations.

The typical building control system (including those utilizing the APOGEE INSIGHT Workstation) has a plurality of field panels that are in communication with one of the workstations. Additionally, the building control system includes one or more field devices in communication with the field panels. Each field device is operative to typically measure and/or monitor various building control system parameters, but may also provide active control.

While the workstation is generally used to make modifications and/or changes to one or more of the various components of the building control system, a field panel may also be operative to allow certain modifications and/or changes to one or more parameters of the system. This typically includes parameters such as temperature and otherwise, set point changes, modify a control program or the like.

As system components/devices fail or require upgrading, it is often desirable or necessary to replace a device of a certain type with a device of a different and/or third party type. Often, the device being replaced has been improved through increased functionality. It is also often desirable to increase the functionality of a building system by adding new devices or subsystems. Devices serving identical or similar functions may often communicate using different protocols and/or commands. Such devices are coupled to the system through devices having firmware to facilitate communication between the device and the building system. Thus, when a new device is added to a building system, it is necessary to alter the appropriate firmware in order to facilitate communication between the building management (control) system and the new device on the system.

A drawback to the current state of building automation systems, however, is the difficulty in integrating new hardware devices into the existing building system or integrating a third party subsystem with the existing building control system. Often, building automation/control systems are designed to use proprietary devices and cooperate readily only with other proprietary systems. Such systems are not easily adapted to integration with third party hardware devices.

The integration of new hardware devices into existing building automation systems can be complicated, especially when the new hardware device is from a third party manufacturer or when the new proprietary hardware device incorporates different functionalities. A large building may have hundreds of sensors, room controllers, and actuation devices. All of these elements must be interconnected in some manner so that both local and overall control operations may be carried out. Firmware or software applications for the operation of the system (applications) may require updating of one or more drivers in order to facilitate communication of the system with the device through the device driver.

As is known in the art, a driver is a program that controls a device. Every device, be it a printer, disk drive, or keyboard, must have a driver program. Many drivers, such as keyboard drivers come with the operating system. For other devices, it may be necessary to load a new driver into the system when the device is connected to a computer system. In DOS systems, drivers are files with a ".sys" extension. In Windows environments, drivers often have a ".drv" extension. Other designations or no particular designations may also be associated with a driver.

A driver acts like a translator between the device and programs that use the device. Each device has its own set of specialized commands that only its driver knows. In contrast, most programs access devices using generic commands. The driver, therefore, accepts generic commands from a program and then translates them into specialized commands for the device.

Currently, applications for a building system environment are created by an application engineer. The application is then installed into the system. These application engineers are typically located at a remote location (referred to as Home Office) from the location (referred to as "Branch" or "Field") at which the building control system is installed. Typically, once an application engineer at Home Office has generated the appropriate applications and an ISB file, the ISB file is sent to the branch to flash the driver with the additional application(s).

In view of the above, there is a need for a building control system that reduces the time required to integrate a new building control device into the building control system. Moreover, in view of the above, there is a need for a building control system that allows easy integration of a new building control device into the existing building control system.

In view of the above, there is a further need for a building control system that reduces the time necessary to create an integration database and/or application for a new building control system device or hardware in a building control system. Moreover, in view of the above, there is a need for a building control system that easily incorporates new hardware into a building control system via creation of an integration database and/or application for the new hardware.

In view of the above, there is a need for a building control system that provides an Application Builder that allows field personnel to generate an integration database and/or applications for new devices being installed to the building control system.

SUMMARY OF THE INVENTION

The present invention is an integration tool for integrating and/or commissioning a new device into a building control system. The integration tool allows the creation of one or more databases and/or applications for the new device.

In one form, the present invention is a software tool for integrating a building control device into the building control system. In another form, the present invention is an integration tool for creating databases and/or defining applications for new devices being integrated into a building control system.

The present invention will allow individuals to create "user defined" applications for any integration device. The integration tool will include an Application Builder (subtool).

The Application Builder is used to integrate any device having a driver that has been developed to support this solution, i.e. Johnson N2 Master device, a BACNet Driver device, a Modbus device, or other device utilizing an application type driver through creation of an ISB file. The Application Builder allows the selection of appropriate points. An Integrated Systems Binary (ISB) file is created or generated as the output of the Application Builder tool.

In accordance with an aspect of the present invention, the Application Builder provides for the creation of an ISB file (Integrated Systems Binary file) that is flashed into memory of a field panel or the like. Points are defined and an application is created by selecting appropriate points, either individually or by importing a CSV (Comma Separate File) to more efficiently populate the points. Once the application is saved, the Application Builder creates an ISB file, by selecting the appropriate applications, which are then flashed into the driver preferably using the Firmware Loading Tool, as part of a more general Commissioning Tool firmware menu.

The above-described features and advantages, as well as others, will become more readily apparent to those of ordinary skill in the art by reference to the following detailed description and accompanying drawings.

BRIEF DESCRIPTION OF THE DRAWINGS

FIG. 8 is a screen capture of an open application with all of its points available.

FIG. 9 is a screen capture of a "Save ISB function" of the present Application Builder.

DETAILED DESCRIPTION

Figure 1:
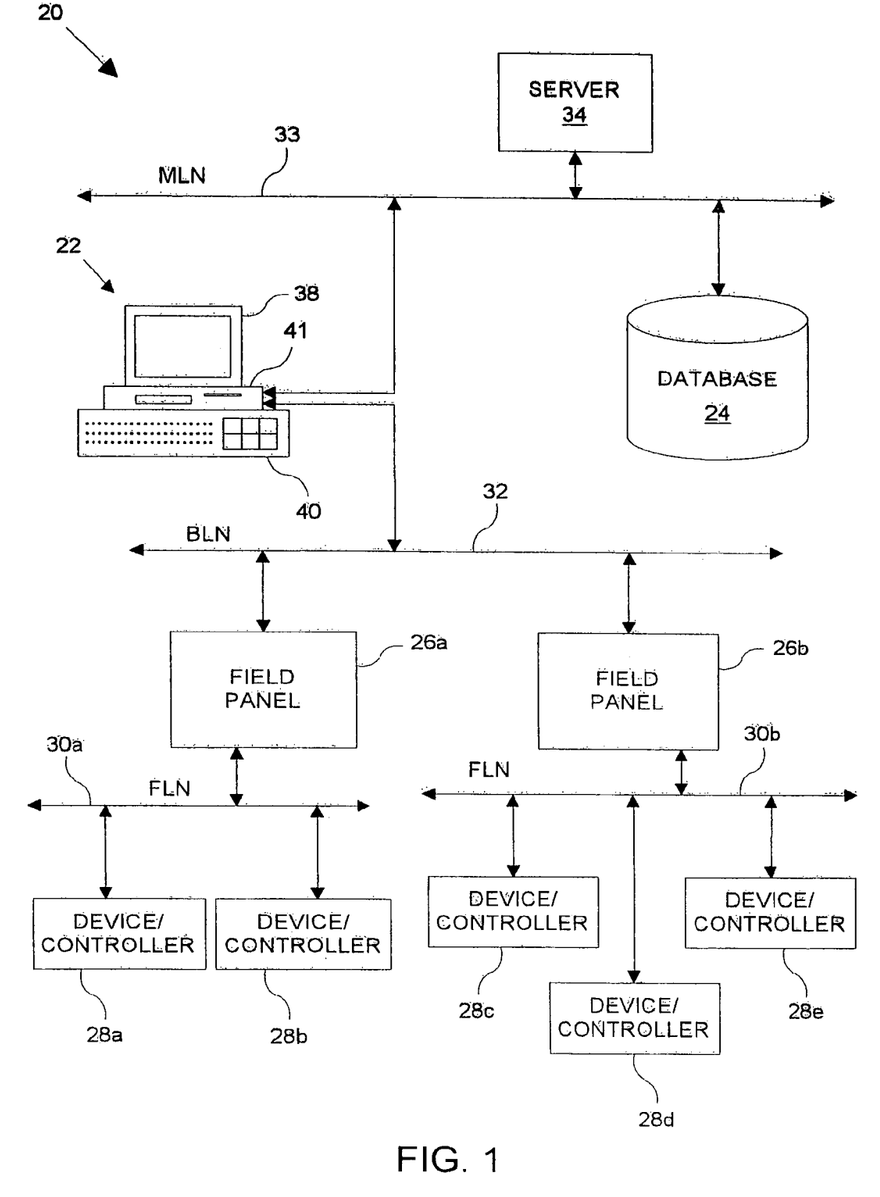
FIG. 1 is a block diagram of an exemplary building control system in which the present invention is utilized.

FIG. 1 depicts a system block diagram of an exemplary building control system (BCS) 20 in which the subject invention as set forth above and below, is be used. The building control system 20 is depicted as a distributed building system that provides control functions for any one of a plurality of building operations. Building control systems may thus include HVAC systems, security systems, life or fire safety systems, industrial control systems and/or the like. An example of a BCS is the APOGEE system available from Siemens Building Technologies, Inc. of Buffalo Grove, Ill., USA. The APOGEE system allows the setting and/or changing of various controls of the device and/or components of the system, generally as provided below. It should be appreciated that the building control system 20 is only an exemplary form or configuration of a building control system. Therefore, the principles of the subject invention are applicable to other configurations and/or forms of building control systems.

The building control system 20 includes at least one supervisory control system or workstation 22, a system database (db) 24, a plurality of field panels represented by field panels 26a and 26b, and a plurality of devices represented by devices

28a-28e. The BCS 20 may also include other components and/or devices not particularly shown and/or described herein.

Each of the devices 28a-28e represents one of plurality of localized, standard building control subsystems, devices and/ or controllers, such as space temperature control subsystems, lighting control subsystems, or the like, and/or any combination thereof. To carry out control of any of its associated subsystem, each device 28a-28e connects to one or more sensors and/or actuators, (not shown).

Typically, a device that is a controller effects control of a subsystem based on sensed conditions and desired set point conditions. The controller controls the operation of one or more actuators to attempt to bring the sensed condition to the desired set point condition. By way of example, consider a temperature control subsystem that is controlled by the device 28a, where an actuator (not shown) is connected to an air conditioning damper (not shown) and the sensor (not shown) is a room temperature sensor. If the sensed temperature as provided by the sensor is not equal to a desired temperature set point, then the device 28a may further open or close the air conditioning damper via the actuator to attempt to bring the temperature closer to the desired set point. Such systems are known. It is noted that in the BCS 20, sensor, actuator and set point information may be shared between the devices/controllers 28a-28e, the field panels 26a-26b, the work station 22 and any other elements on or connected to the BCS 20.

To facilitate the sharing of such information, groups of subsystems such as those connected to devices/controllers 28a and 28b, are typically organized into floor level networks ("FLNs") and generally interface to the field panel 26a. The FLN data network 30a is a low-level data network that may suitably employ any suitable proprietary or open protocol. Subsystems 28c, 28d and 28e along with the field panel 26b are similarly connected via another low-level FLN data network 30b. Again, it should be appreciated that wide varieties of FLN architectures may be employed.

The field panels 26a and 26b are also connected via a building level network ("BLN") 32 to the workstation 22 and the database 24. The field panels 26a and 26b thereby coordinate the communication of data and control signals between the devices/subsystems 28a-28e and the supervisory computer 22 and database 24. In addition, one or more of the field panels 26a, 26b may themselves contain terminal equipment controllers. To this end, as shown in FIG. 1, the field panel 26a is operatively connected to one or more terminal devices/ controllers 28a, 28b.

The workstation 22 provides overall control and monitoring of the building control system 20 and includes a user interface 40 that is embodied as a keyboard. The user interface may include or only have a mouse (not shown) or other similar input device. The workstation 22 includes a processing unit 41 that is typical of a computer, as well as a display 38. The workstation 22 further operates as a BCS data server that exchanges data with various elements of the BCS 20. The BCS data server can also exchange data with the database 24. The BCS data server 22 allows access to the BCS system data by various applications. Such applications may be executed on the workstation 22 or other supervisory computers, not shown, connected via a management level network ("MLN") 33. Preferably, but not necessarily, the workstation 22 is used to launch, run and/or utilize the present integration tool as described herein.

The workstation 22, which is a user access point for the system components (including the field panels 26a and 26b), is operative to accept modifications, changes, alterations and/ or the like ("workstation events") from the user. This is typically accomplished via a user interface for or of the computer 22. The user interface may be the keyboard 40 of the workstation 22. The workstation 102 is operable to, among other things, affect or change operational data of the field panels 26a, 26 as well as other components of the BCS 20. The field panels 26a and 26b utilize the data and/or instructions from the workstation 22 to provide control of their respective devices/controllers 28.

The workstation 22 is also operative to poll or query the field panels 26a and 26b for gathering data. The workstation 22 processes the data received from the field panels 26a and 26b, including maintaining a log of field panel events and/or logging thereof. Information and/or data is thus gathered from the field panels 26a and 26b in connection with the polling, query or otherwise, which the workstation 22 stores, logs and/or processes for various uses. To this end, the field panels 26a and 26b are operative to accept modifications, changes, alterations and/or the like ("field panel events") from the user.

The workstation 22 also preferably maintains a database associated with each field panel 26a and 26b. The database maintains operational and configuration data for the associated field panel.

The supervisory computer or workstation 22 may be operatively connected to an external server 34 (such as a web server) and other supervisory computers, not shown, via the MLN 33 that may suitably be an Ethernet. The supervisory computer 22 uses the MLN 33 to communicate BCS data to and from other elements on the MLN 33, including the web server 34. The database 24 stores historical data, error data, system configuration data, graphical data and other BCS system information as appropriate.

The MLN 33 may connect to other supervisory computers, not shown, Internet gateways including, by way of example, the server 34, or other gateways to other external devices, not shown, as well as to additional network managers (which in turn connect to more subsystems via additional low level data networks). The MLN 33 may suitably comprise an Ethernet or similar wired network and may employ TCP/IP, BACnet, and/or other protocols that support high speed data communications.

The field panels 26a and 26b are operative to accept modifications, changes, alterations and/or the like from the user with respect to objects defined by the BCS 20. The objects are various parameters, control and/or set points, port modifications, terminal definitions, users, date/time data, alarms and/ or alarm definitions, modes, and/or programming of the field panel itself, another field panel, and/or any controller in communication with a field panel. It should here be appreciated that for the below discussion when appropriately referring to FIG. 1, the functionality, features, attributes, characteristics, operation and/or the like of each field panel is the same for every field panel except where indicated, and will be described as such with reference to only field panel 26a. Therefore, the below discussion with reference to field panel 26a is equally applicable to all field panels unless indicated otherwise.

The BCS 20 is not a static system in that devices and/or components (hereinafter, generally and collectively, "devices") may be added to the BCS, deleted from the BCS and/or modified once installed in the BCS. In accordance with an aspect of the subject invention, the BCS 20 is operative, adapted and/or configured to allow field personnel or other users of the BCS 20 to integrate a new device (e.g. a fire system panel, chiller or continuous range of PLC registers), a new system, and/or a new application for a device (collectively, device, unless indicated to the contrary) via an automated integration tool. Such addition of a new device is preferably accomplished at a field panel 26 or other device of the BCS 20 through coupling to a user's laptop or other computer. The new device may be a preconfigured device (i.e. a device whose properties are fixed and correspond to a particular piece of foreign system equipment, such as a chiller, with such preconfigured devices usually consisting of a defined composition of points of a varying type)), a field-configurable device (i.e. a device such as a fire system panel whose properties and composition are unique to a particular installation and which cannot be ascertained at the time of manufacture of the driver), or a ranged device. The automated integration tool creates and/or generates an application or a database via point specific input by the user (e.g. one or more dialog boxes) that obtain user information with regard to the new device and/or application. The created file is then flashed into the memory of the receiving device of the BCS 20 to be used by the driver associated with the new device.

Figure 2:
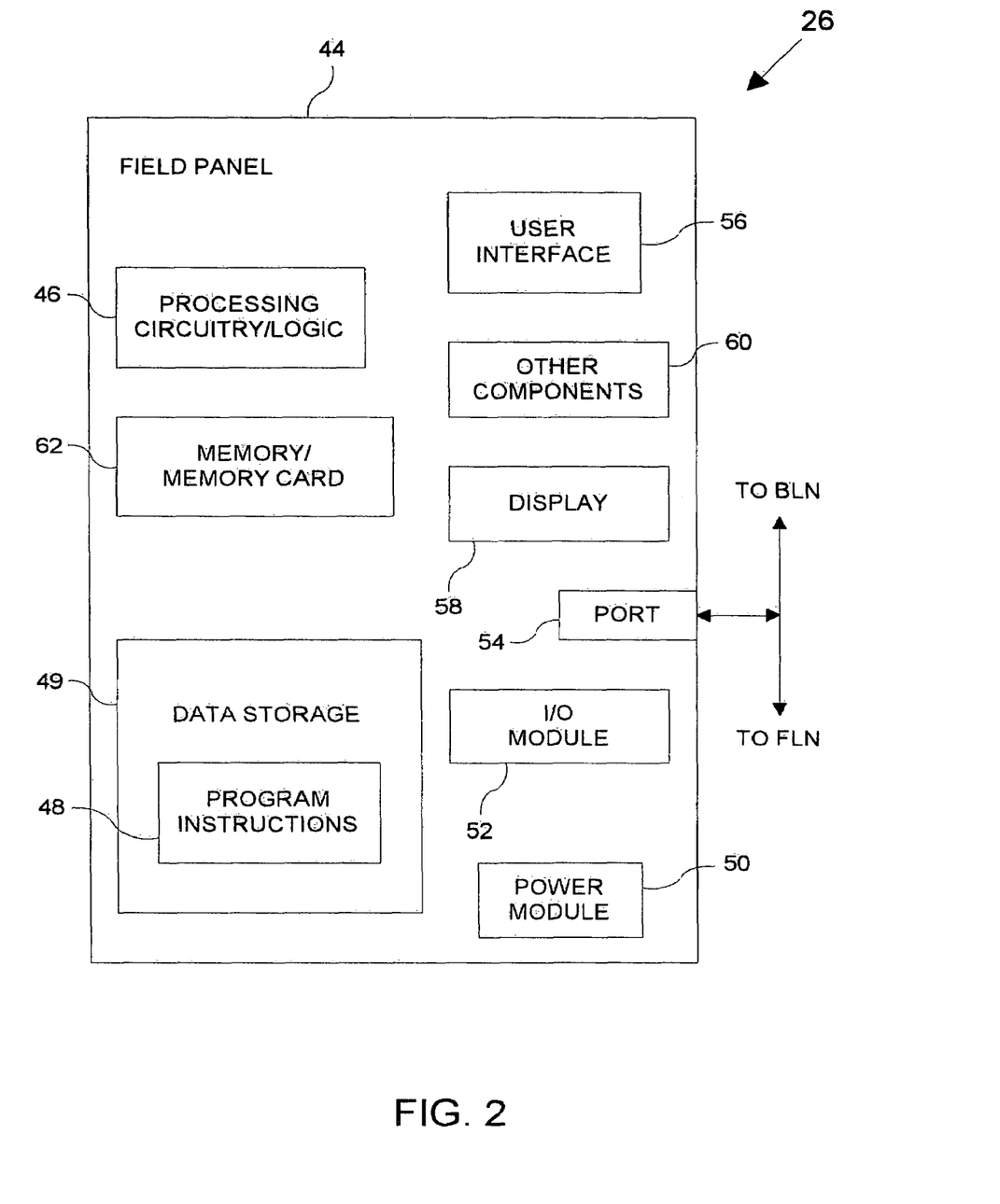
FIG. 2 is a block diagram of an exemplary control station or field panel of the building control system of FIG. 1 on which the present invention may be stored and/or executed.

FIG. 2 presents a block diagram of an exemplary architecture or embodiment of a field panel 26a. It should be appreciated that the architecture of the field panel is only an exemplary embodiment of a field panel in which the subject invention may be utilized. As such, the exemplary embodiment of the field panel 26a of FIG. 2 represents all manners or configurations of field panels and/or other BCS devices that are operative in the manner set forth herein.

The field panel 26 (representing all field panels and/or destination devices for the created integration database/application) includes a housing, cabinet or the like 44 that is configured in a typical manner for a building control system field panel. The field panel 26 includes processing circuitry/logic 46 that is operative, configured and/or adapted to operate the field panel 26 including the features, functionality, characteristics and/or the like as described herein. To this end, the processing circuit 46 is operatively connected to (in communication with) all of the elements of the field panel 26 described below. The processing circuitry/logic 46 is typically under the control of program instructions or programming 48 (software or firmware) including various device drivers. The program instructions 48 are stored in a data storage device 49.

The field panel 26 also includes a power module 50 that is operative, adapted and/or configured to supply appropriate electricity to the field panel 26 (i.e. the various components of the field panel). The power module 50 preferably operates on standard 120 volt AC electricity, but may operate on 24 volt AC electricity or include DC power supplied by a battery or batteries.

An input/output (I/O) module 52 is also provided in the field panel 26. The I/O module 52 includes one or more input/output circuits that communicate directly with terminal control system devices such as actuators and sensors. Thus, for example, the I/O module 52 includes analog input circuitry for receiving analog sensor signals from a sensor of the like, and includes analog output circuitry for providing analog actuator signals to the sensor or the like. The I/O module 52 typically includes several of such input and output circuits.

The field panel 26a further includes a digital communication port circuit 54. The digital communication port circuit 54 allows for communication to the devices/controllers 28 as well as other components on the FLN 30, and furthermore allow for communication with the workstation 22, other field panels and other components on the BLN 32. To this end, the digital communication port circuit 54 includes a first port that may suitably be a RS-485 standard port circuit, that is connected to the FLN 30a, and a second port that may also be an RS-485 standard port circuit is connected to the BLN 32. A user's laptop is also connectable to the field panel.

The field panel 26 may also be accessed locally. To facilitate local access, the field panel 26 includes a local communication/user interface 56. The local communication/user interface 56 provides communication between the field panel 26 and a user, and from an external interface device such as a computer (not shown). The interface device 56 may also obtain data from the field panel 26 such as user-generated field panel events and/or data regarding user-generated field panel events, for example, identification data regarding the user-generated field panel event. An external interface device may be temporarily connected to the field panel 26a for the purpose of sending data to the field panel and/or acting as a user-interface for the field panel 26.

The user interface 56 of the field panel 26 includes a display 58 for displaying data. The display 58 may suitably be an LCD type screen or the like. The display 58 is operative, configured and/or adapted to show information regarding the field panel 26, such as status information, and/or other data pertaining to the operation, function and/or modifications or changes to the field panel 26 as well as other information, menus, dialog boxes and/or the like.

As discussed generally above, modifications and/or changes to the field panel 26 made by a user (e.g. such as indicating that a new third party device has been added to the FLN) are accomplished, in one form, through the local communication I/O module 52. Other user-generated field panel events may be made to any field panel parameter, characteristic, programming, and/or the like. Changes may also be made to field panel parameters, characteristics, programming and the like to another field panel. Such changes may then be communicated to such other field panels via the BLN 32. Similarly, user-generated changes to the field panel 26 may be received from the BLN 32 such as a database and/or application for a new device as created and/or generated by the present integration tool running on the workstation 22.

The field panel 26 also includes memory or a memory card 62. The memory 62 is operative, configured and/or adapted to temporarily receive and/or store data or information for the field panel 26 such as the created application and/or database from the present integration tool. The memory 62 may be a random access memory (RAM) buffer or other type of device that temporarily stores data/information and allows the retrieval of the stored data. In particular, the memory 62 is flashed by to the Firmware Loading Tool when the database and/or application is complete stores the data for use by the particular driver associated with the new device being integrated and commissioned. Thus the memory or memory card 62 of the field panel 26 stores the drivers and/or associated database/application for facilitating communication between and control of the devices on the FLN 30 controlled by the field panel 26. The software (program instructions) running on the field panel 26 is configured to permit flashing the device drivers on the memory/memory card 62.

As indicated above, the building control system 20 supports the addition of a new device (or new applications) through a user interface known as the integration tool. The integration tool has several functions and/or features for integrating various types devices (drivers) into the BCS that may be considered subtools or modules of the integration tool. Machine readable media of the workstation 22 (preferably), a field panel 26 or the like stores the present integration tool as firmware and/or software to be executed thereon. Particularly, the program instructions for the operation, maintenance, diagnostics and/or the like for the building control system includes a commissioning tool main menu for the commissioning or integration of a new device into the system 20.

The integration tool is made up of an application builder for the step-through creation of device applications. Particularly, the present Integration Tool includes an Application Builder that is used to integrate a Johnson N2 Master device, a BACNet Driver device, a Modbus device, etc. or other device utilizing an application type driver through creation of an ISB file. An Integrated Systems Binary (ISB) file is created or generated as the output of the ISB.

Figure 3:
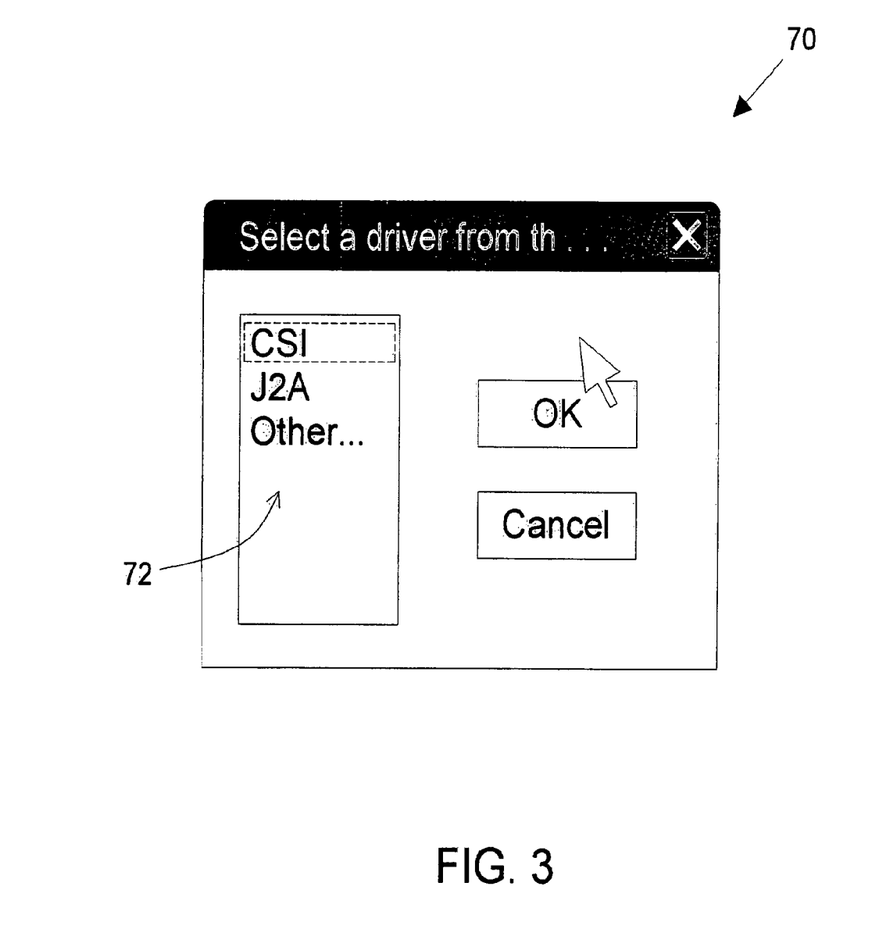
FIG. 3 is a screen shot view of an exemplary initial window of the present integration tool in which an appropriate driver is selected.

In all cases, the integration of a new device is started by invoking the Integration Tool from a menu of the Commissioning Tool. As indicated above, this is generally accomplished on the user's laptop or PC of the BCS 20. Upon making the appropriate selection, the integration tool opens up a dialog box 70 as depicted in FIG. 3. FIG. 3 depicts an exemplary screen (dialog box) 70. The dialog box 70 includes the typical WINDOWS dialog box features/functions. Additionally, however, the dialog box 70 has an Integration Device Information section 72 in which the user selects the third ($3^{rd}$) party system. The integration device information section includes a listbox menu that presents choices The information or data input in response will set the appropriate rules for the system to be integrated to.

The present invention provides for the functionality initially required to accomplish generating applications for certain specific drivers and types of drivers. Those drivers and types of drivers include, but not limited to Johnson Controls N2 Master (application type), BACnet Driver (application type), Modbus Enhanced Driver (application type), CSI Host Protocol Driver (application type). Those skilled in the art will recognize that the disclosure herein may be applicable to the generation of translators and databases for permitting communication between a building automation system and a device.

The disclosed application builder software is a seamless tool that allows the field personnel to define applications specific to their job needs. The tool allows the field offices to create applications easily which will in turn result in less negative slip. The disclosed integration tool is particularly useful in integrating Johnson N2 Master (Baseline 551 or greater), BACnet Driver (Baseline 551 or greater), Modbus (Baseline 551 or greater) and Other Application Type Driver (Baseline 551 or greater) devices into the APOGEE building automation system. Such system runs software including a firmware loading tool that allows flashing of an ISB (Integrated Systems Binary) File which contains the custom applications created with Application Builder and allows the end user to upload an ISB from a driver for future upgrades.

Figure 4:
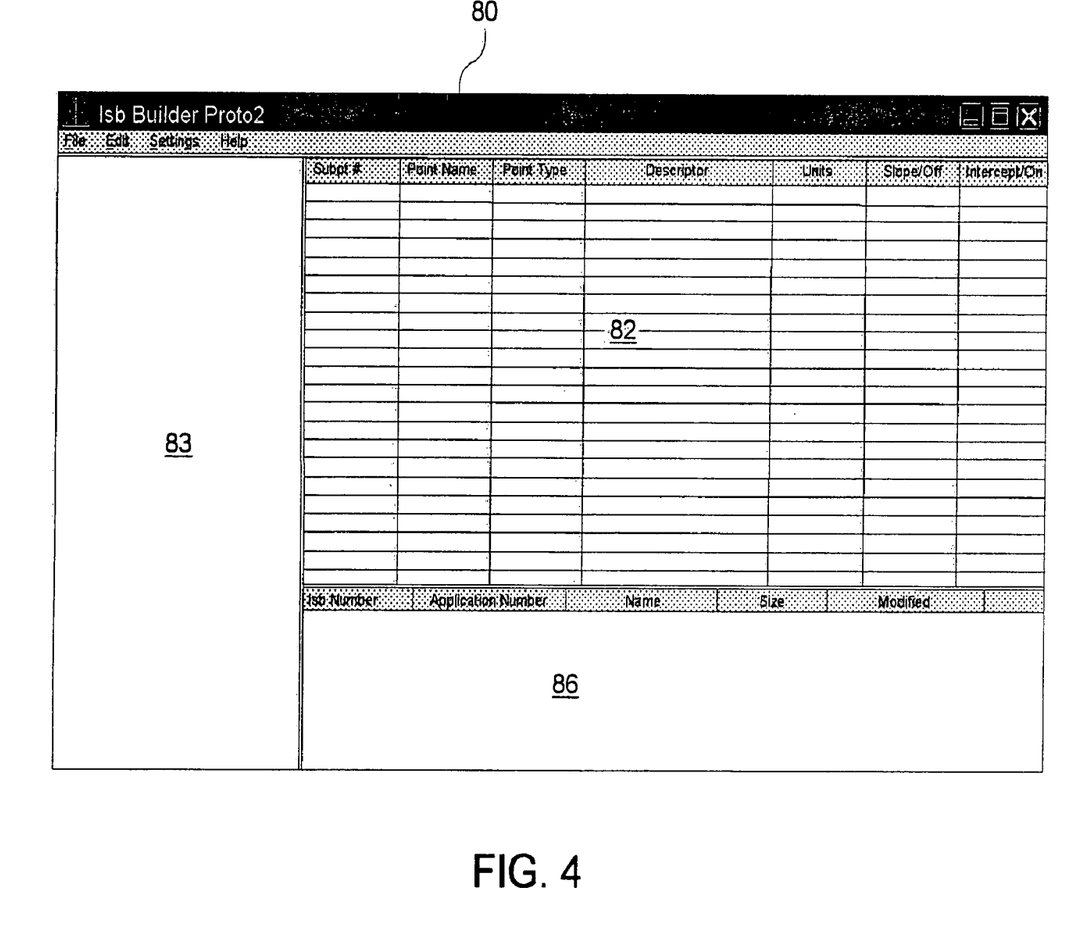
FIG. 4 is a screen shot view of an exemplary initial Application Builder window of the present integration tool presented after driver selection.
Figure 5:
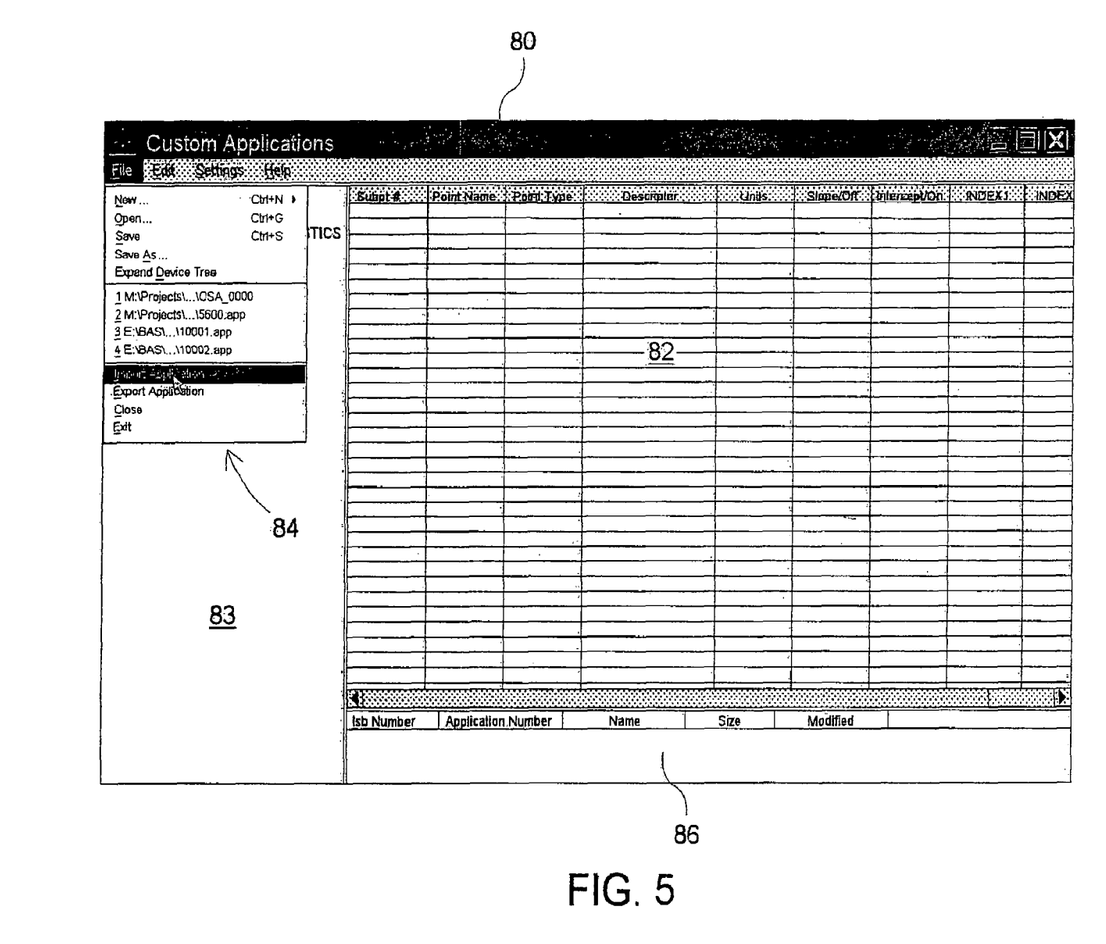
FIG. 5 is a screen shot view of the Application Builder window of FIG. 4 showing the accessing of a CSV file for Importing of a CSV function.

Referring to FIG. 4 there is shown a screen shot 80 of the disclosed Application Builder portion of the present Integration Tool for a WINDOWS operating system (shown as an "Isb Builder Proto2"). The screen shot 80 includes a parameters or points section 82 for the Application to be built upon. The section 82 will be populated according to the shown designations (headings) through user selections. When updating a building management system with a new device, the user will open the Application Builder from the Commissioning Tool menu or be automatically sent to the Application Builder in response to the selected driver in FIG. 3, and then select the system for which they will be creating applications. This driver list will be located under File, New as shown in FIG. 5. FIG. 5 shows the screen shot 80 with a further pane or view 86 showing the various ISBs. Particularly, the screen shot 80 of FIG. 5 shows the pull down file selection 84 in the view or pane 83 of the screen shot 80. This allows the user to select a particular file. This tool will be used to create applications which can be flashed into the driver using a firmware loading tool ("FLT") a screen shot of which is provided as FIG. 10.

An exemplary manner of operation of the Application Builder is as follows. Step 1: The user will be able to import a CSV (Comma Separated File) which will more efficiently populate all of the required fields. The user may also create all of the points one at a time if so desired. Step 2: After the CSV has been imported the tools will validate all of the information so that the user can save the application. Step 3: The user will be able to renumber and modify any of the application fields. Step 4: The user will then save the application. Step 5: Once all of the applications have been created and saved, the use will be able to put those applications into an ISB File, which can then be flashed into the driver. Step 6: After all of the applications have been put in the ISB file and saved, the file can be flashed into the drivers using FLT.

The user will also be able to select points one at a time or use the standard windows features for selecting groups or multiple points at once (CTRL or SHIFT key). Address (1) and Application (2) will always be in the applications point window as the first two points. As points are added to the application they will automatically be numbered in the order they are added. The order can be modified by highlighting the point(s) by clicking the move up or move down buttons. Points 1 and 2, Address and Application will be grayed out so the user will not be able to rearrange or modify them. The user can select any box, other than address and application, to modify the point names, slopes, intercepts or units.

Before saving the application the user must define an application number. This range of numbers is between 10,000 and 10,999. The application description field is optional. When saving the application file the user will be prompted for the location or directory to save the file. It should default to the current working directory that the Commissioning Tool is referencing, but with an Integration Folder added. (i.e. C:\Jobs\E1234\Integration).

By saving the application(s) the user will be able to create the ISB file. The user will be able to select multiple applications to be incorporated into the ISB file. The tool will automatically create an application for the diagnostics. This application number is predetermined by the application engineer and entered into the tool. When the application is flashed it will also be addressed to the proper FLN and Drop. The tool will also be capable of importing a existing ISB file and allow applications to be added to that file. The tool will validate the applications before creating the ISB, by verifying that there are not more than one instances of an application number, that all units are RAD50 and that there are no duplicate point names. When saving this file it will preferably, but not necessarily, again default to the current working directory. When the Tool is updated for specific drivers only a single file will be required to send to the field.

A jump table will allow FLT to load user defined applications to an area in the drivers ROM. Because these applications will be defined after the core of the driver has been developed, it will be necessary for the core firmware to be able to reference this area of memory for application tables. Devices can have an address from (1-254) and each device can support (0-32,000) points By using the C++ language's facilities i.e. classes, inheritance, etc. the tool has been designed in an object-oriented manner thereby making it easier to add, remove, replace or extend objects. Dependencies have also been minimized so that changes made to one class will not affect another. The use of global variables and functions has also been minimized and where such use has been required, these have, for the most part, been localized in one module.

Microsoft Foundation Classes (MFC) provides a document/view architecture as well as Single Document Interface (SDI) and Multiple Document Interface (MDI) support. The tool uses the document/view architecture in conjunction with SDI to simplify the development process.

The MFC document/view architecture was chosen as the main design framework. This allowed the code to be modularized such that the tool's data and data management was separated from the views. Organizing the application code in this manner allows for easy code maintenance and/or enhancement.

The illustrated Application Builder tool facilitates creation of an ISB file that can be downloaded onto a field panel 26 independently of the driver that will use it. This separates a driver's source code from its data thereby saving time, money and resources required to revise a driver simply because some of its data changed even though its core source code did not. The illustrated Application Builder tool enables Applications Engineers to develop, create and flash applications without the intervention of Software Developers. Additionally, the illustrated Application Builder tool enables field personnel to create custom applications and flash these applications as they deem fit without having to rely on Home Office.

The architecture includes view classes and a document class along with other helper classes and/or functions. The view and document classes all have their roles and responsibilities as outlined below.

The view classes are responsible for displaying data and obtaining data from the user. They may, on occasion, be used for more specialized purposes if the task at hand fits naturally in the view class even though it may not deal with displaying or obtaining data. We encounter this scenario when saving an application or isb (integrated systems binary) file. The view classes comprise of CMainFrame (Navigation View), CPointListView (Point List View), CIsbView, and CSplitterView (CSplitter Doc). As shown, for example, in FIG. 6, the view classes CMainFrame, CPointListView, CSplitterView and CIsbView cooperate to create a graphical user interface GUI. The ISB tool application's window 100 consists of three panes 102, 104 and 106. The navigation or tree-view pane 102 to the left (akin to Windows Explorer), the point list view pane 104 to the top right and the isb list view pane 106 to the bottom right as depicted in the exemplary screen shot of FIG. 7.

The application's main window is contained in CMainFrame class. This class is responsible for creating the main window—including the frame and toolbars—along with creating the splitter windows i.e. the navigation pane, the point view/edit pane and the isb pane.

The CMainFrame class (which utilizes header file MainForm.h and main file MainForm.cpp containing the main function and the implementation for the header file) is automatically supplied by the MFC framework when using the wizard to generate an initial SDI framework for the application. To create splitter windows, the (OnCreateClient) function has to be overridden and modified. For a detailed description of this implementation, refer to the source code in MainForm.cpp.

The CPointListView class (which utilizes the header file PointListView.h and the main file PointListView.cpp) is responsible for displaying and accepting point data. All point details are displayed in the point edit pane and any modification to a point's attributes are handled by CPointListView.

The CSplitterView class (which uses the SplitterView.h header file and SplitterView.cpp main file) represents the left hand pane in FIG. 8. The CSplitterView class gives a tree view of the drivers, applications, reports and isbs that are open. This class is used extensively when creating drivers, applications, reports and isbs. The class implements drag-n-drop functionality for creating an isb, viewing and modifying properties for a driver, report, isb or an application, adding an application to a driver, adding a report to an application, dragging applications between two drivers with the same driver acronym but different driver revisions (e.g. J2A 3.2 and J2A 3.3) and saving of an ISB or application file.

The IsbListView class (that utilizes the IsbListView.h header file and IsbListView.cpp main file) handles operations that occur in the Isb pane view. The IsbListView class displays the applications present in an isb in a detail view format. The detail view format is a format similar to selecting View->Details in Windows Explorer. The IsbListView class also implements application deletion from an isb file.

The Document class is responsible for application data manipulation and data management. Manipulation may involve operations such as changing Endianness of a digital word or interpretation of bytes read from a file. Management may involve temporary storage of data using data structures most suitable for the data being manipulated or referred to. The Document defines and implements constructs that map into the problem domain e.g. there are classes such as CSubPoint, CReport, CApplication, etc. all of which directly map to the problem domain. The document class is represented by CSplitterDoc but relies on other helper functions/classes to create a suitable solution.

Figure 6:
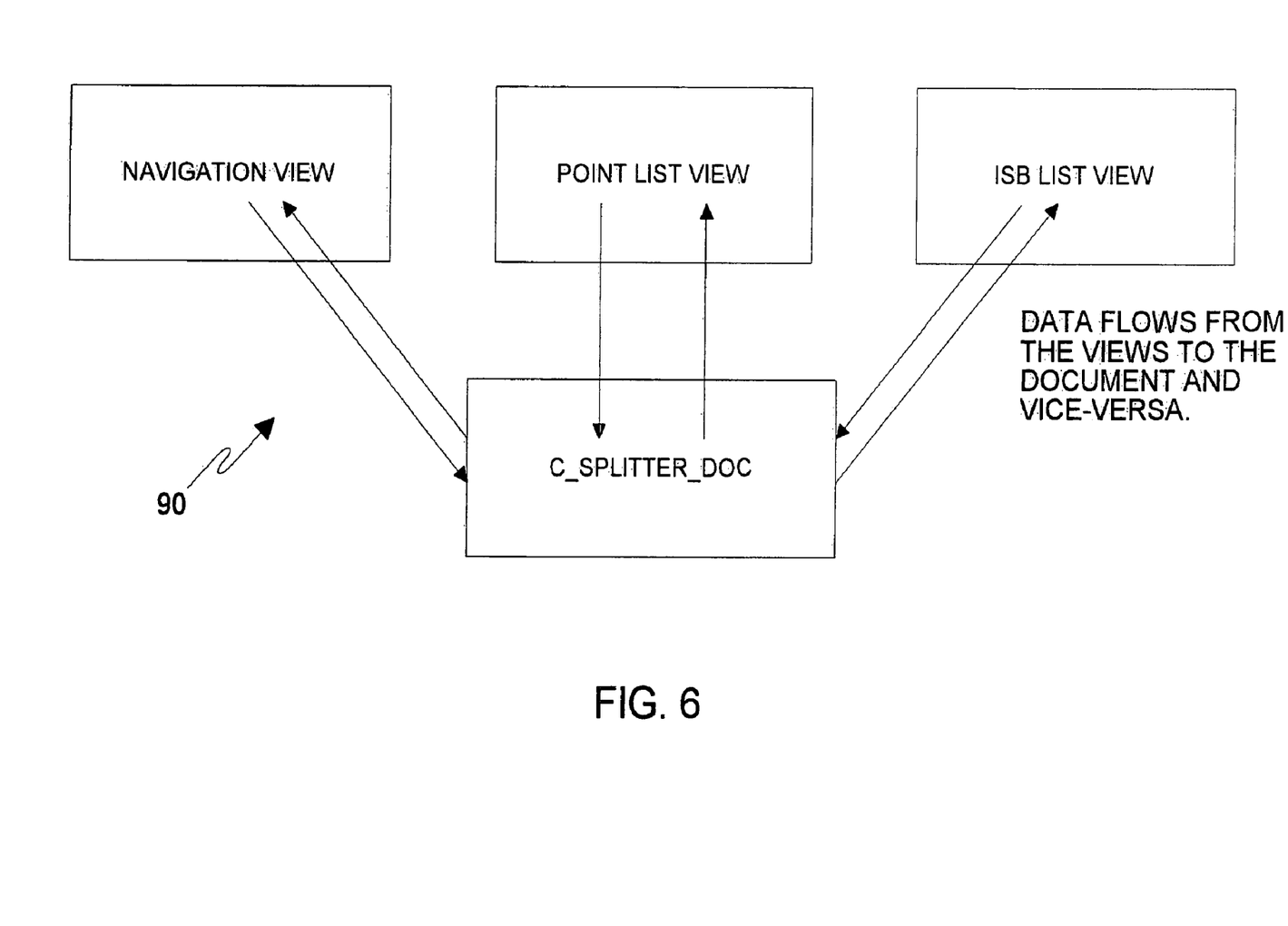
FIG. 6 is diagram of the data flow that is utilized by the present software.

As illustrated, for example, in FIG. 6, the document class integrates with the view classes. A document refers to anything not handled in the view and in particular, the tool application's data. The document is responsible for creating and maintaining data structures as well as providing API's to these structures that hide the underlying implementation. A document is, in most cases, responsible for internally handling end user requests received from any one of the views. CSplitterDoc is the document class but it relies on other classes and utility functions to provide the required functionality. The Document is responsible for creating new drivers, applications from a Comma Separated Value (CSV) files, new ISBs and new reports. The document is also responsible for creating applications and populating applications via the point list view i.e. manually entering point information in the point list view. The document is also responsible for modification of applications, reports or isbs. The document also serves as temporary storage of driver, application, report and isb information. The document is also utilized for reading application or isb files. The document is responsible for informing the views of any changes to data that may require their attention. The major classes that CSplitterDoc relies on are: CApplication, CSubPoint, CIsb and Creport.

The Document gets requests from a view via a pointer to the Document in the view class. A request may be for any one of the above mentioned functions. After processing the request, the Document sends a coded update message to all the views via an API provided by the framework i.e. UpdateAllViews( . . . ). Any view that processes the code sent with the update message captures information sent along with the message and refreshes itself with the new data.

Figure 7:
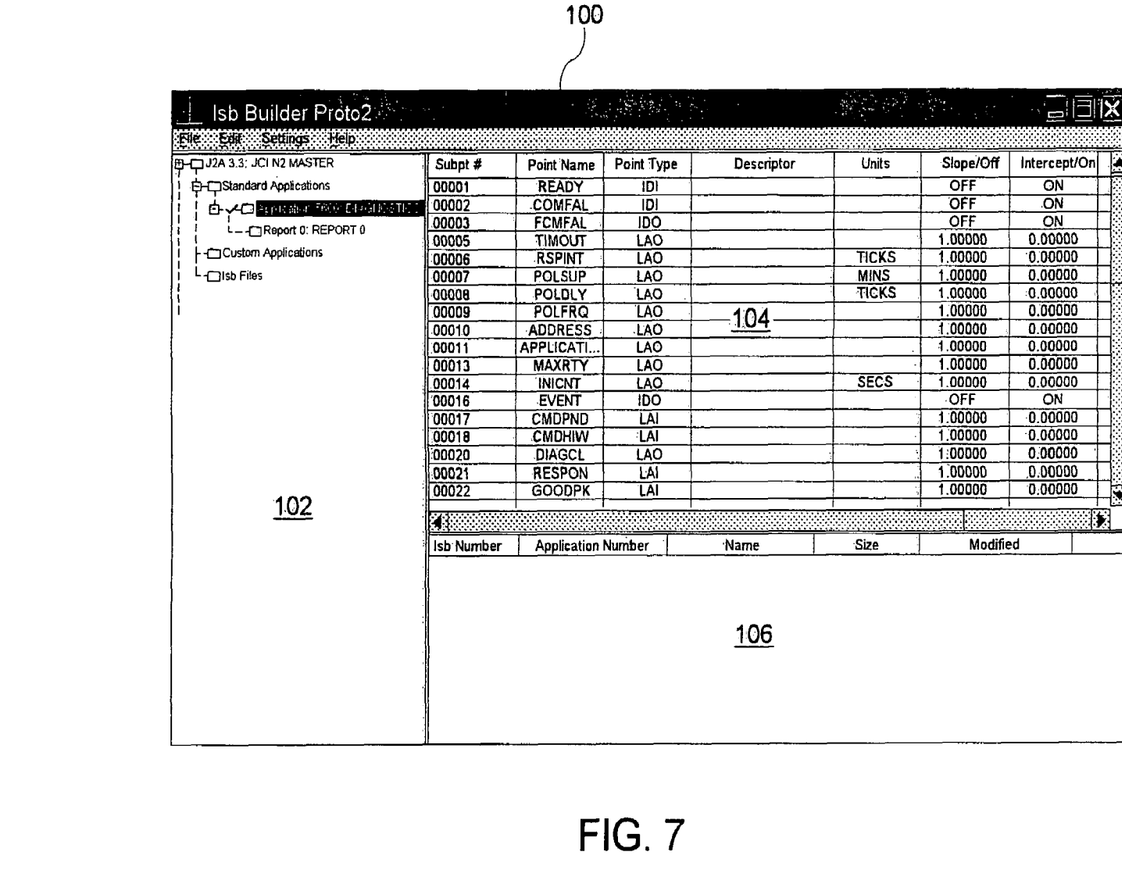
FIG. 7 is a screen shot of the Application Builder window showing a diagnostics application.

FIG. 7 depicts the screen shot 100 of an Application Builder function. The screen shot 100 provides the navigation view pane 102, the point list view pane 104, and the Isb list view pane 106 ready to allow selection of the various items. FIG. 8 depicts a selected application ("5601 VAV Application") as indicated by the tree listing in the navigation view plane 102 and a populated point list view pane 104.

The Application Builder may also include various diagnostics for the application, a screen shot 120 of which is depicted in FIG. 9. The screen shot 120 illustrates various parameters 122 that can be selected by the user for testing of the build application.

Figure 10:
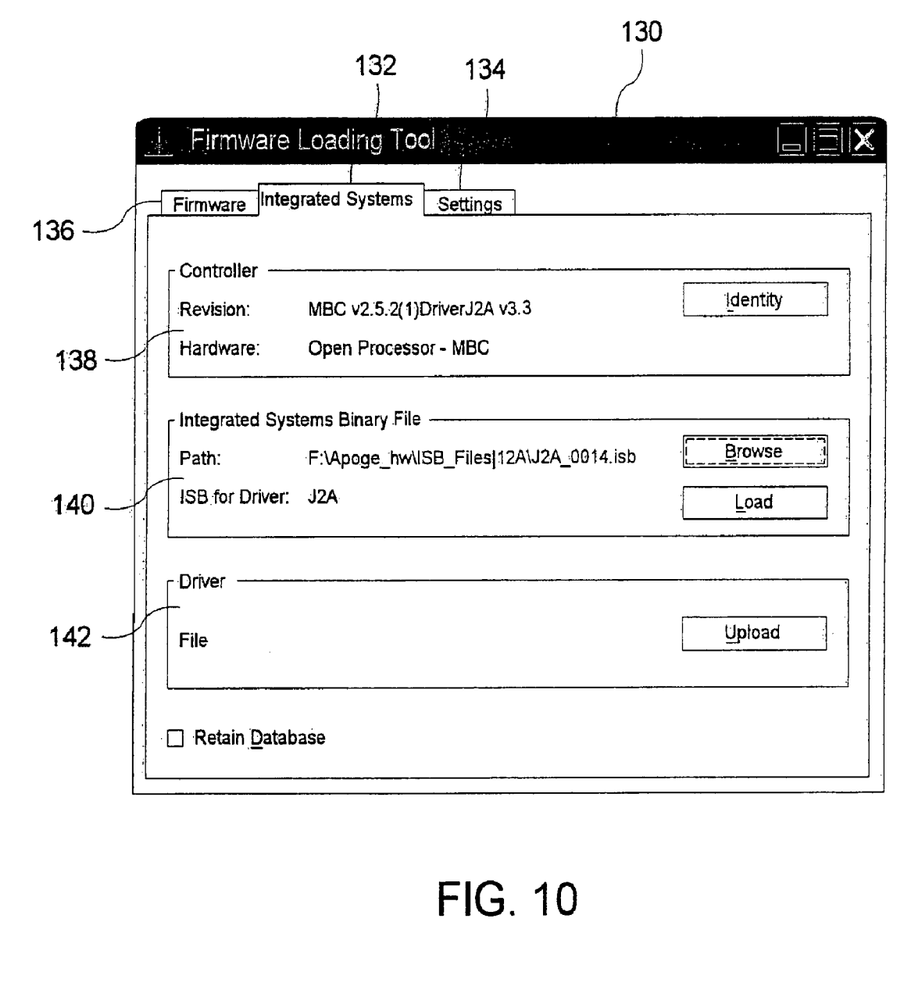
FIG. 10 is a screen capture of a Firmware Loading Tool window.

FIG. 10 depicts a screen shot 130 of the Firmware Loading Tool (FLT) in accordance with an aspect of the subject invention. The FLT has several tabs 132 (Integrated Systems screen), 134 (Setting selection screen) and 136 (Firmware selection screen) with the Integrated Systems screen 132 being shown. The integrated systems screen 132 portion of the FLT 130 allows the user to upload the created ISB file (driver application file) into the BCS 20. The Integrated Systems screen 132 depicts controller information 138, generated ISB information 140, and an upload section 142 for uploading the selected ISB.

Figure 11:
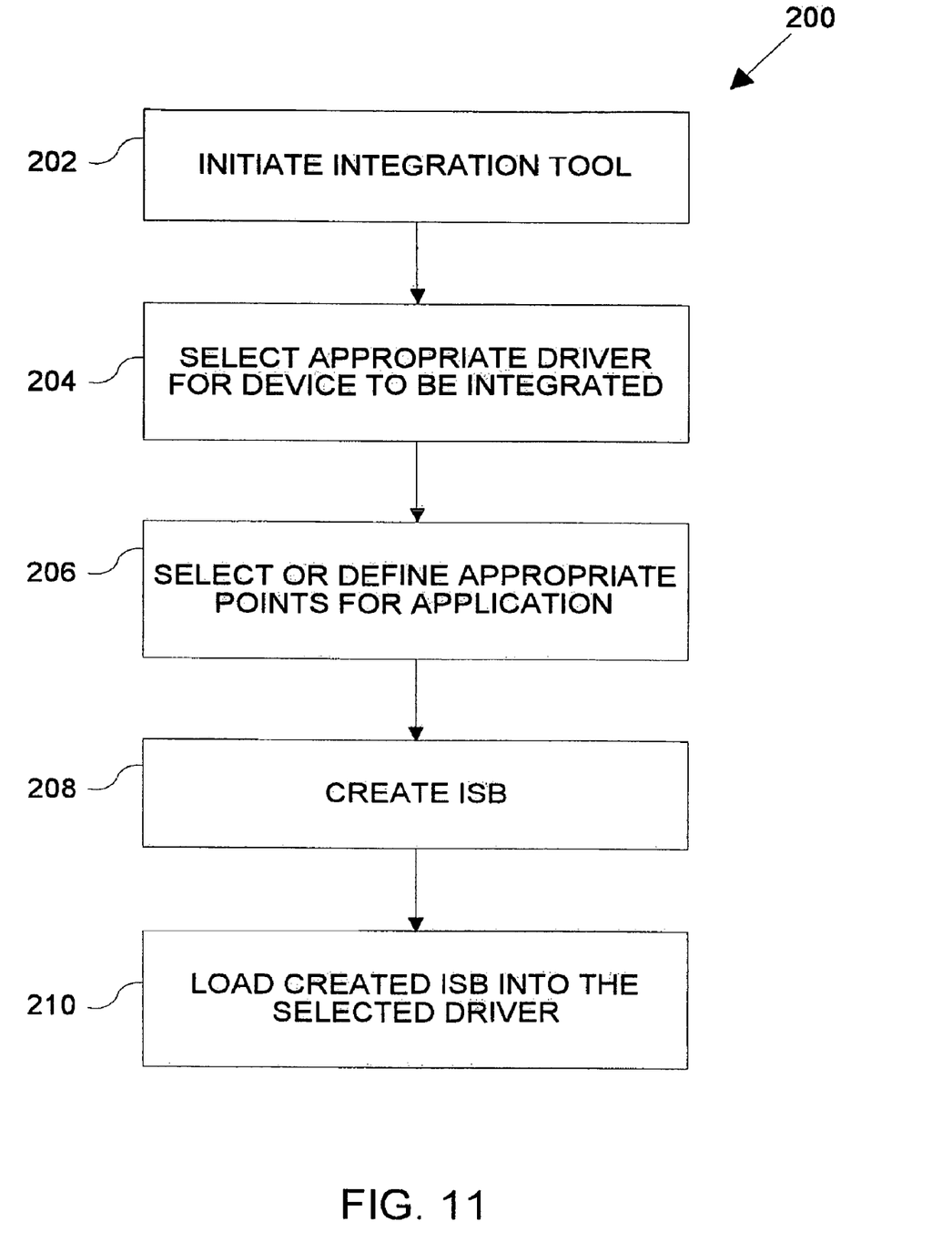
FIG. 11 is a flowchart of an exemplary manner of creating an application for the new device with the present integration tool (Application Builder).

FIG. 11 is a flowchart, generally designated 200, that illustrates a general manner in which the present Application Builder as part of the present Integration Tool operates to allow a user to develop a driver application. In step 202 the Integration Tool is initiated. This is preferably, but not necessarily, initiated from a user's computer (e.g. laptop) that is connected to and/or in communication with the BCS 20 such as through a field panel 26. The Application Builder of the Integration Tool allows the selection of an appropriate driver, step 204. The appropriate driver being a driver associated with the new device that is being integrated into the BCS 20.

In step 206, the user is able to select or define appropriate points for the application. This may be accomplished through selection of individual points or by incorporation of a CSV file. Thereafter, in step 208, the Application Builder creates an appropriate ISB file. In step 210, the ISB file is then loaded into the BCS.

The invention claimed is:

1. A method of integrating a third party device into a building control system, the building control system having a workstation running building control system program instructions and a separately housed field panel in communication with the workstation, the method comprising the steps of:
   providing a user interface separate from the field panel for the input of data regarding a third party building control device that is on the field panel, wherein said third party building control device is one of the group consisting of a sensor or actuator or actuator controller, in an environmental and fire safety system;
   accepting data input from the user regarding the third party building control device through the user interface;
   launching an integration tool in response to the data input from the user regarding the third party building control device;
   generating an integration file by the launched integration tool for use by a driver at the field panel associated with the third party building control device; and
   loading the generated integration file into the separately housed field panel for use by the driver associated with the third party building control device to allow the third party building control device to operate in conjunction with the building control system software.

2. The method of claim 1, wherein the step of launching an integration tool in response to the data input from the user regarding the third party device comprises launching an application builder.

3. The method of claim 2, wherein the step of generating an integration file by the launched integration tool for use by a driver associated with the third party device comprises generating an integration file comprising an integration application file.

4. The method of claim 1, wherein the step of providing a user interface for the input of data regarding the third party device includes providing a user interface comprising at least one dialog box for the input of data regarding the third party device.

5. The method of claim 1, wherein the step of loading the generated integration file into a field panel for use by the driver associated with the third party device comprises flashing the generated integration file into memory of the field panel.

6. A building control system comprising:
   a workstation running building control system software;
   a field panel in electronic communication with, and separately housed from, said workstation via a network; and
   a software integration tool configured to generate a database that will run in conjunction with said building control system software and to aid in integrating a third party building control device into the building control system, said software integration tool operative to a) provide a user interface separate from the field panel for the input of data regarding a third party building control device that is on the field panel, wherein said third party building control device is one of the group consisting of a sensor or actuator or actuator controller, in an environmental and fire safety system, b) accept data input from the user regarding the third party building control device through the user interface, c) launch an application builder in response to the data input from the user regarding the third party building control device, d) generate an application file by the launched application builder for use by a driver associated with the third party building control device, and e) load the generated application file into the field panel for use by the driver associated with the third party building control device.

7. The building control system of claim 6, wherein the integration tool is operative to provide a user interface for the input of data regarding the third party device by providing at least one dialog box for the input of data regarding the third party device.

8. The building control system of claim 6, wherein the integration tool is operative to load the generated application file into said field panel for use by a driver associated with the third party device by flashing the generated application file into memory of the field panel.

9. The building control system of claim 6, wherein said software integration tool is stored on a computer of a user.

10. The method of claim 1, wherein providing the user interface for the input of data regarding the third party device comprises providing the user interface workstation.

* * * * *